Patented May 21, 1929.

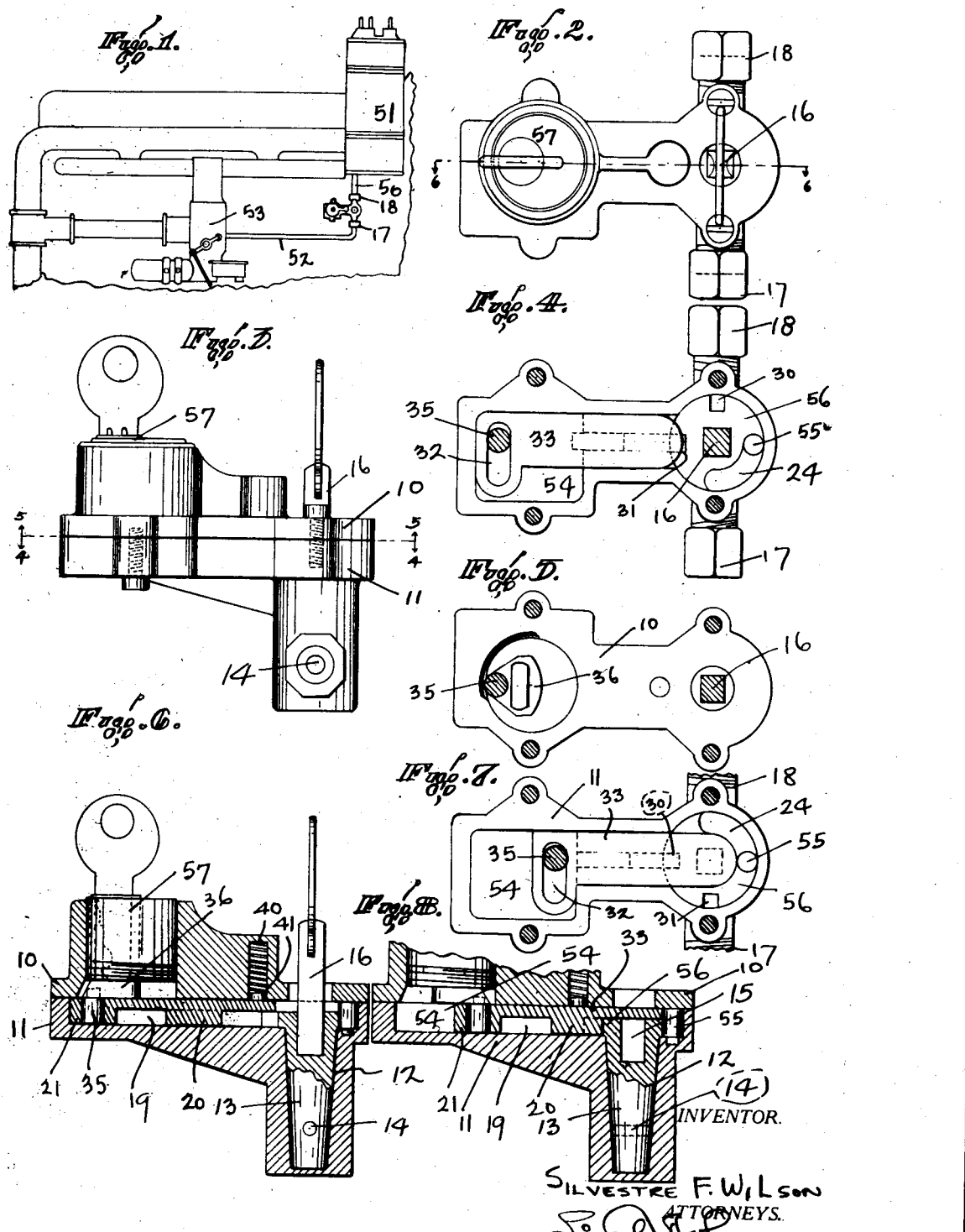

1,713,635

UNITED STATES PATENT OFFICE.

SILVESTRE F. WILSON, OF OAKLAND, CALIFORNIA.

LOCK FOR SHUT-OFF VALVES.

Application filed October 29, 1927. Serial No. 229,630.

This invention relates particularly to a shut off valve for the gasoline line of an automobile.

The device provides a precautionary measure against the theft of automobiles and when applied in the proper manner to the gasoline line of an automobile, a prospective thief will find himself unable to proceed away with the car by virtue of the fact that the valve locking device has shut off the gasoline supply to the engine.

The device contemplates the provision of a manually operated valve body having a valve plug rotatably mounted within the valve body, the valve body being mounted within a casing and has latch members related thereto that is slidable to conceal a key socket in the valve plug and to prevent access thereto, the latch members being reciprocated by a key controlled element mounted within the casing.

In this specification and the annexed drawings, the invention is illustrated in the form considered to be the best, but it is to be understood that the invention is not limited to such form, because it may be embodied in other forms, and it is also to be understood that in and by the claims following the description, it is desired to cover the invention in whatsoever form it may be embodied.

In the accompanying one sheet of drawings:

Fig. 1 is a plan view of my device showing the same in operative position on the intake feed line of an internal combustion engine.

Fig. 2 is an enlarged front view of the device showing the valve in open position, and showing the key inserted in the socket in the valve plug.

Fig. 3 is a side view of Fig. 2.

Fig. 4 is a plan sectional view taken on line 4—4 of Fig. 3 showing the valve in an unlocked open position.

Fig. 5 is a plan sectional view taken along the line 5—5 of Fig. 3.

Fig. 6 is a cross sectional view taken along the line 6—6 of Fig. 2 showing the valve in open position.

Fig. 7 is a plan sectional view showing the valve in locked and closed position.

Fig. 8 is a view similar to Fig. 6 showing the device in a locked and closed position.

Similar characters of reference are employed in all the above described views to indicate corresponding parts throughout. The device involves in its general organization a two part casing consisting of an upper section 10 and a lower section 11. The lower section 11 is provided with a tapered bore forming a valve cylinder for a tapered valve plug 13 which has an aperture 14 therethrough to conduct fluid through the valve. The upper end of this plug 13 is provided with a socket 15, preferably squared, to receive the shank of a plug key 16 to turn the valve to admit fluid therethrough or to shut off the same. The lower casing 11 is provided with an inlet port 18 on one side thereof communicating the valve bore through a pipe 50 with a fluid supply tank 51, and an outlet port 17 that communicates through a pipe 52 with the engine carburetor 53. The upper face of the casing 11 is provided with a flat bottomed recess 54 in which there is an elongated groove 19. A latch member 33 having downwardly extending lugs 20 and 21 slides in the recess 54 in the casing 11 with the lugs 20 and 21 confined in the elongated groove 19.

The valve plug 13 has a circular head 56 thereon which on its periphery is recessed at 24 to receive a pin 55 that is secured on the face of the casing 11 and has its rotative movement limited thereby. The circumferential recess 24 permits the valve plug to turn through an arc of 90° so that the aperture 14 through the valve plug may be brought into registry or swung out of registry relative to the ports 17 and 18. Notches 30 and 31 are formed in the valve plug and are adapted to receive the forward lug 20 on the latch member 33 when the valve is in either the open or closed position. A slot 32 extends through the latch member 33 adjacent one end thereof and a pin 35 is confined in the latch slot. The pin 35 is formed on an eccentric plate 36 on the key controlled lock 57.

A cavity 40 is formed in the face of the upper casing 10 and a spring pressed friction element 41 is mounted in the cavity and bears firmly against the top of the latch member to force the member 33 against the valve plug to keep the plug tightly seated on the tapered bore and to prevent fluid leakage. Suitable bolts or the like serve to retain the two sections of the casing together.

In actual use when the latch member 33 is retracted as shown in Figs. 4 and 6, the squared plug key 16 may be inserted in the socket 15 in the valve plug and the valve may be turned to either open or close the fluid supply to the carburetor.

When the squared plug key 15 is removed the latch member 33 may be reciprocated by means of eccentric pin 35 on the barrel of the lock 57 to extend the latch member 33 completely across the socket in the valve plug to prevent any key from being inserted into the valve socket and the valve plug turned. The valve plug may be locked in either the open or closed position by the latch member 33. The periphery of the circular valve head will not permit closing of the latch member when the valve is in the partially opened position. When either of the squared notches 30 and 31 in the valve head is in alignment with the forward projection 20 on the sliding latch member 33, the valve 13 may be opened or closed and the latch 33 closed over the valve plug.

Having thus described this invention, what I now claim and desire to secure by Letters Patent is:

1. A device of the character described comprising a casing; a key controlled valve in said casing there being an opening in said casing to permit insertion of a key to operate said valve; a latch member in said casing adapted to close said opening; means to lock said member in position over said opening when said valve is open or closed; and means to prevent locking of said member when said valve is in a partially open position.

2. A device of the character described comprising a casing, a valve in said casing having a socket therein to permit insertion of a key to operate said valve; a slidable member in said casing adapted to cover said valve socket; and means on said valve to prevent locking of said member when said valve is in a partially open position.

3. A device of the character described comprising a casing having an opening therein; a valve in said casing having peripheral notches therein, to be actuated by a key inserted through the opening in the casing, a slidable member in said casing adapted to close said opening and cover the valve; a locking device in the casing operatively connected to said member to move the same, a lug on said member to engage the peripheral notches in said valve when said member covers or uncovers the valve and said valve is open or closed.

4. A device of the character described comprising a casing having a tapered bore and inlet and outlet ports communicating with said bore; a tapered valve rotatably mounted in said bore; a member slidably mounted on said casing to cover said valve; means to press said member against said valve to seat the valve in the bore; and means to reciprocate the member relative to the valve to cover or uncover the valve.

In testimony whereof, I have hereunto set my hand, this 24 day of September, 1927.

SILVESTRE F. WILSON.